Figure 1:
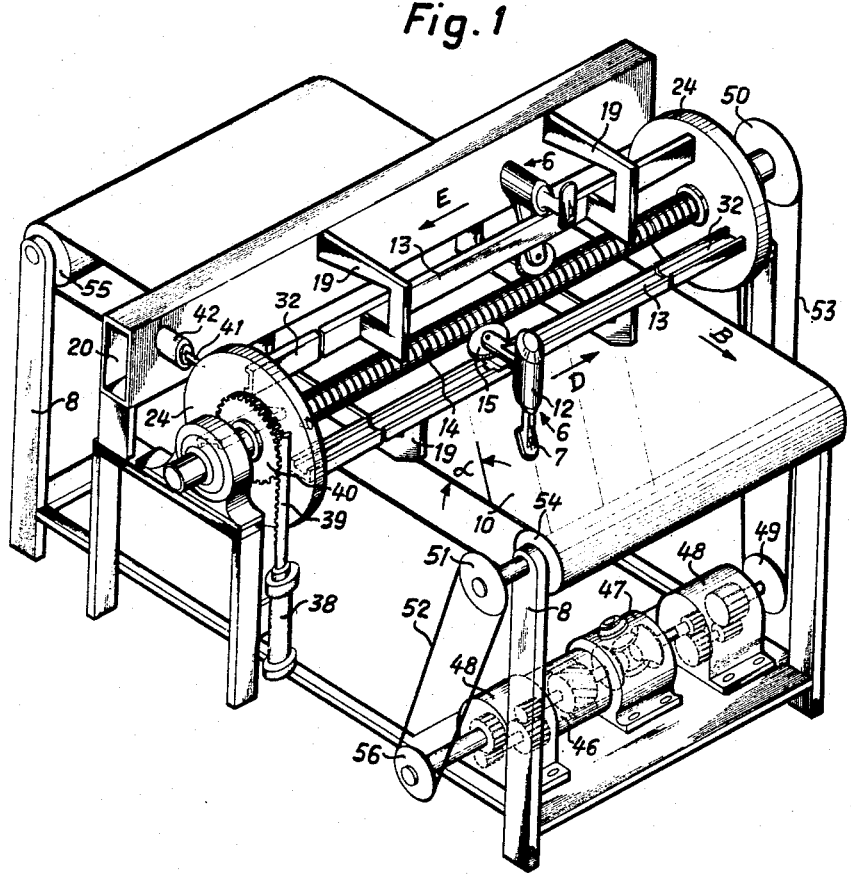

May 16, 1967 H. WILD ET AL 3,319,500
APPARATUS FOR CUTTING AN ELONGATE WEB OF MATERIAL INTO STRIPS
Filed March 25, 1965 4 Sheets-Sheet 1

INVENTORS
Hans Wild
Karl Siegenthaler
BY
Cushman, Darby & Cushman
Attorneys

May 16, 1967   H. WILD ET AL   3,319,500
APPARATUS FOR CUTTING AN ELONGATE WEB OF MATERIAL INTO STRIPS
Filed March 25, 1965   4 Sheets-Sheet 2

INVENTORS
Hans Wild
Karl Siegenthaler
BY
Cushman, Darby & Cushman
Attorneys

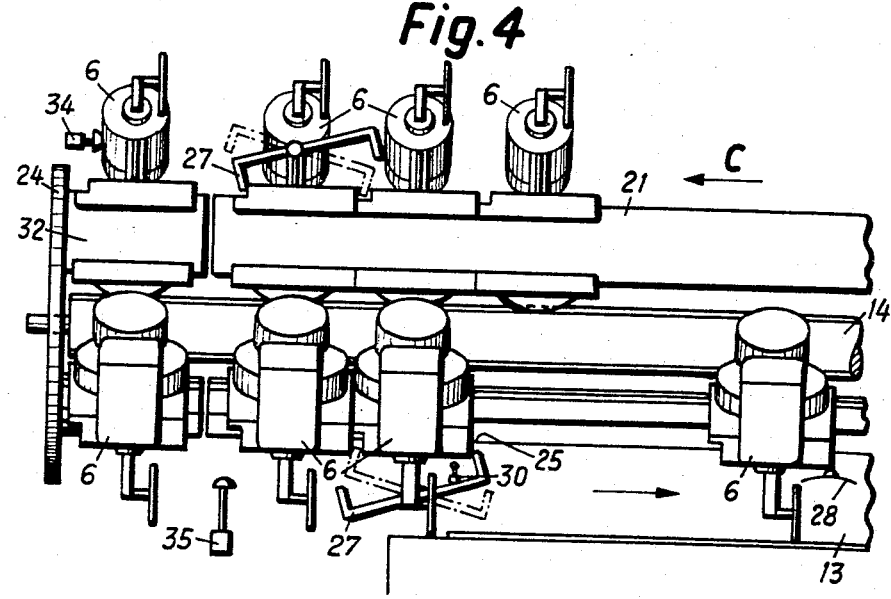
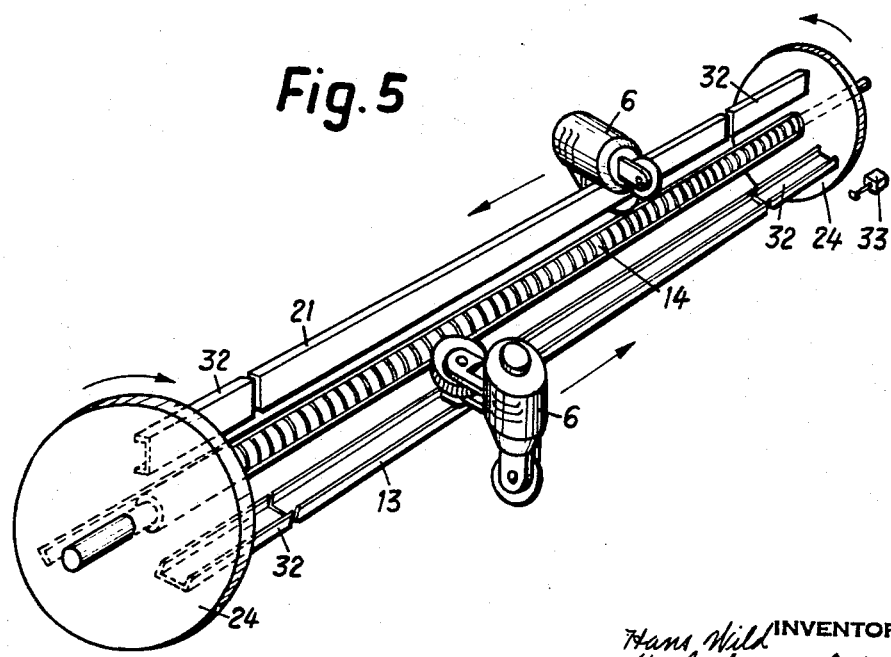

United States Patent Office 3,319,500
Patented May 16, 1967

3,319,500
APPARATUS FOR CUTTING AN ELONGATE WEB OF MATERIAL INTO STRIPS
Hans Wild, Muttenz, and Karl Siegenthaler, Pratteln, Switzerland, assignors to Fabrik fur Firestone Produkte AG., Pratteln, Switzerland, a Swiss company
Filed Mar. 25, 1965, Ser. No. 442,611
Claims priority, application Switzerland, Mar. 26, 1964, 3,990/64
12 Claims. (Cl. 83—353)

This invention relates to a method of and a machine for cutting an elongate web of material into strips. The material may be of fabric or foil, for example, and the invention may be of particular use in the manufacture of motor vehicle tyres in which the tyres are composed of layers of strips of material, the strips being cut from a web of material at an angle to the longitudinal direction of the web.

According to the present invention a method of cutting an elongate web of material into strips comprises continuously moving said web in a first linear direction which is along the length of said web, and repeatedly and continuously moving a cutting device across the width of said web in a second linear direction which is at right angles to said first linear direction whereby the web is cut into a plurality of strips which define an obtuse angle with the length of said web.

With such an arrangement, the width of the strips cut and their dimensions can be controlled precisely. The continuous process has been found to be more accurate than the use of an intermittent process in which a cutting device is moved across a stationary web, the web then being moved forwardly before the next cut is taken. With the present continuous process a more accurate cutting arrangement is provided and the throughput of the arrangement is greatly increased.

Preferably the web and cutting device are moved at constant speeds whereby the strips have straight, parallel edges.

According to another aspect of the present invention there is provided a machine for cutting an elongate web of material into strips comprising means for continuously moving said web in a first linear direction which is along the length of the web, a cutting device, and means for continuously and repeatedly moving said cutting device across the width of said web in a second linear direction which is at right angles to said first linear direction to cut the web into a plurality of strips which define an obtuse angle with the length of said web.

Preferably the drives for said web and cutting device are coupled whereby the rates of movement in said linear directions are in a predetermined ratio. Thus the drives may be taken from a common source, at least one of said drives including a variable ratio gear arrangement by which the ratio of said rates of movement may be varied. Preferably the web and cutting device are driven by belt and/or chain drives.

The web of material may be moved by an endless belt on which it rests and the cutting device may comprise a cutter mounted on a carriage, the carriage being slidably mounted on a guide rail disposed transversely of said web, and a worm and wheel drive for moving the carriage along said guide rail. Thus the roller of the endless belt may be driven by a belt drive and the worm may be driven by a chain drive from a common source.

The cutting devices may be moved across the web of material by disposing the carriages on guide rails, transfer devices being provided at each end of the guide rails to transfer the cutting devices from one guide rail to the other.

The invention is illustrated merely by way of example, in the accompanying drawings, in which:-

Figure 2:
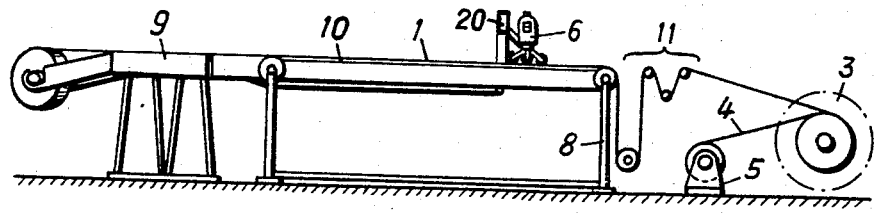
Figure 3:
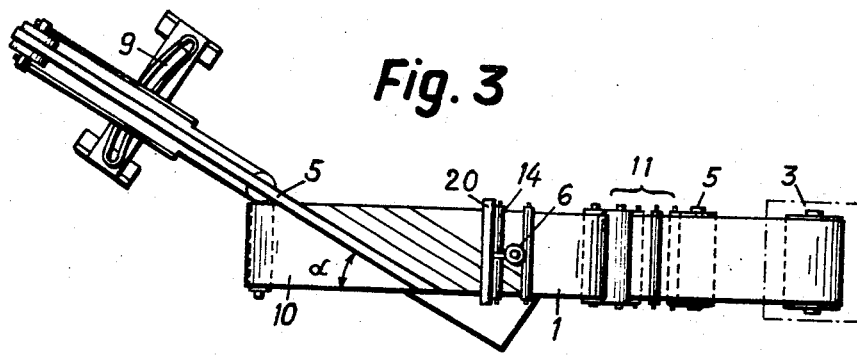
Figure 8:
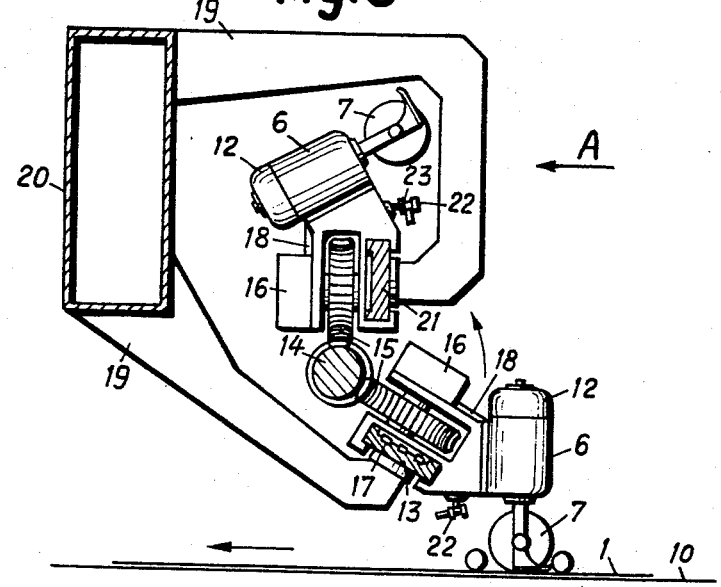
Figure 6:
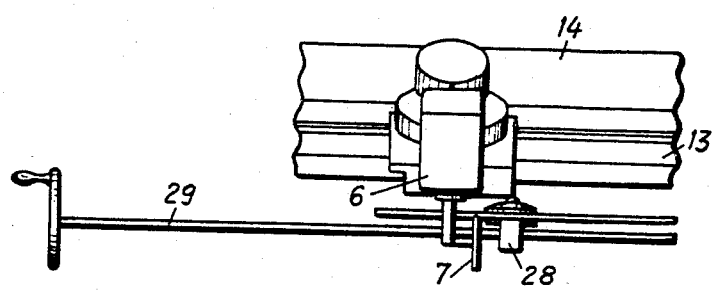
Figure 7:
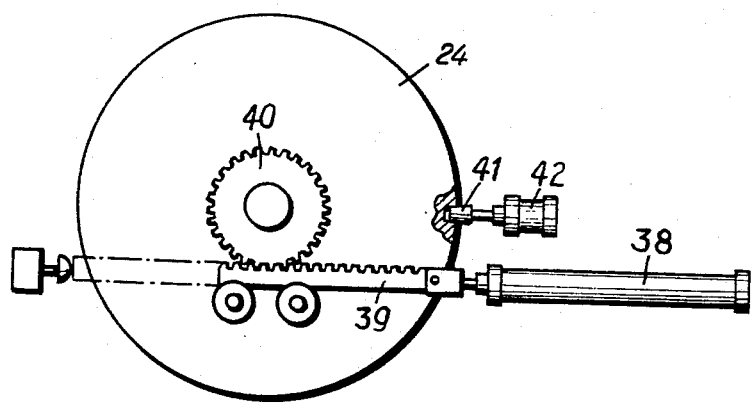

FIGURE 1 is a perspective view of a machine according to the present invention,
FIGURE 2 is a side elevation of a production line including the machine shown in FIGURE 1.
FIGURE 3 is a plan of the production line of FIGURE 2,
FIGURE 4 is an end elevation of part of the machine of FIGURE 1,
FIGURE 5 is a perspective view of a further part of the machine of FIGURE 1,
FIGURE 6 is an end elevation of part of the machine of FIGURE 1,
FIGURE 7 is a side elevation of part of the machine of FIGURE 1, and
FIGURE 8 is a part sectional end elevation of further components of the machine of FIGURE 1.

Referring now to the drawings, there is shown in FIGURES 2 and 3 a production line for cutting a web 1 of material into strips 5, the strips being disposed obliquely with respect to the length of web 1. The web 1 is wound on a drum 3, consecutive layers of the web 1 being separated by a strip 4 of material which prevents consecutive layers of the material 1 from sticking together. The material 4 is wound onto a drum 5′. The web 1 passes over compensating rollers 11 and thus onto an endless belt 10 mounted upon a frame 8 and past cutting devices 6 supported from static supporting structure 20.

The cutting devices 6 are arranged to cut the web 1 into a plurality of strips 5 disposed at an angle α to the length of the web. The strips 5 are cut at angle α to the length of the web 1 by moving cutting devices 6 transversely across the web 1 in a continuous movement simultaneously with the continuous movement of web 1 across endless belt 10. The manner in which this simultaneous movement is obtained is described below with reference to the remaining drawings. The strips 5 which are cut from the web 1 are wound onto a further drum forming part of a winding mechanism 9, means being provided for varying the position of the winding mechanism relative to the frame 8 in accordance with variation in the angle α.

The machine for cutting the web 1 into strips and including the components 6, 8, 10 and 20 as seen in FIGURE 3, is shown in more detail in FIGURE 1, further components of the machine being shown in greater details in FIGURES 4 to 8. Referring to these drawings, it will be seen that the cutting machine comprises a frame 8 supporting two rollers 54, 55 about which there is wound an endless belt 10 on which the web 1 of material is adapted to move in the direction of the arrow B. Mounted across the upper surface of endless belt 10 is a hollow beam 20 constituting static supporting structure for four arms 19 which are arranged in pairs, each pair supporting one of two guide rails 13 which are also disposed transversely across the endless belt 10 extending from one side to the opposite side thereof.

At each end of the guide rails 13 there are disposed rotary discs 24 each of which is provided with three equi-spaced rail members 32 adapted to form continuations of guide rails 13. Discs 24 are adapted to be rotated by a rack and pinion device 39, 40 under the operation of a ram 38 in a manner described in more detail below.

Slidably mounted on the guides 13 are a plurality of cutting devices 6 which are shown in more detail in FIGURE 8. Each cutting device 6 comprises a carriage 18 on which is mounted an electric motor 12 drivingly connected to a cutting wheel 7 suspended below the electric motor 12. The carriage 18 is adapted to be slidably mounted on the lower guide rail 13 and to make contact with electrical contact 17 for supplying current to the electric motor 12. Also mounted in the carriage 18 is a worm wheel 15 which meshes with a worm shaft 14 which extends across the endless belt 10, being rotatably mounted in bearings at either side thereof. An electromagnetic clutch 16 is also provided on each carriage 18 for placing the worm wheel 15 into and out of driving engagement with the carriage. Thus the wheel 15 is in permanent contact with shaft 14, but the carriage 18 is driven only when clutch 16 is engaged.

An electric motor 46 is fixed to frame 8 and drives the roller 54 of endless belt 10 through a gear box 48, a pulley 56, an endless belt 52 and a pulley 51. Electric motor 46 also rotates the shaft 14 through a variable ratio gear box 47, the gear box 48 and chain sprockets 49, 50 interconnected by a chain 53.

In operation, motor 46 is continuously rotated and thus endless belt 10 rotates continuously thereby urging the web 1 continuously in the direction of arrow B at a constant speed. Motor 46 also rotates the worm shaft 14 at a continuous rate and thus any cutting device 6 which is disposed on the lower guide rail 13 and is in driving contact with the worm shaft 14 will progress in the direction of arrow D i.e. at right angles to the feed B. The cutting device 6 will be moved at a constant predetermined rate and, due to the combined constant relative linear movement B and D, strips 5 will be cut at an angle α to the direction of movement B.

The cutting devices 6 move transversely across the web 1 in the direction of the arrow D on the lower guide rail 13 and are moved back across the endless belt 10 in the direction of the arrow E on the upper guide rail 13. To transfer the cutting devices 6 between these guide rails, the rotatable discs 24 are used. Movement of the right hand rotatable disc i.e. the disc shown at the right hand end of FIGURES 1 and 5, is effected by a contact switch 33 which actuates a ram and rack and pinion arrangement similar to 38, 39, 40 shown on the left hand side of FIGURE 1. As a cutting device 6 moves off the lower guiding rail 13 onto the corresponding guide member 32 which is aligned therewith, the cutting device 6 will contact the switch 33 and thus the rotatable disc 24 will rotate in the direction of the arrow shown in FIGURE 5 until the cutting device 6 is aligned with the upper guide rail 13. At this stage a chain 22 (see FIGURE 8) engages a catch 23 formed on the carriage 18 and causes the cutting device 6 to move along the upper guide rail 13 in the direction of the arrow E. The cutting device 6 is thus returned to the left hand side of the endless belt 10 (as shown in FIGURE 1) and moves onto the guide member 32 of the left hand rotatable disc 24, the disc 24 rotating to place the cutting device 6 into alignment with the lower guide rail 13. The process is then repeated.

The worm wheel 15 is in contact with the worm shaft 14 at all times when moving in the direction D and in the direction E but the electromagnetic clutch 16 is operative only when the carriage 18 is on the lower guide rail 13 and thus the carriage 18 is moved by the worm 14 only when the carriage is on the lower guide rail 13. At all other times, although the wheel 15 is in contact with the worm 14, the wheel 15 simply freely rotates within carriage 18 without moving the carriage.

The operation of the electromagnetic clutch 16 is started by an electrical contact 28 shown in more detail in FIGURES 4 and 6. Electrical contact 28 is operated by one cutting device 6 and, upon operation, the contact 28 actuates the circuit for the actuation of the electromagnetic clutch of the following cutting device 6. The electrical current which flows on actuation of the contact 28 flows through a contact breaker 30 to the electromagnetic clutch of the following cutting device 6 and, should there be no cutting device 6 at the starting position 25 at the edge of the belt 1, then the contact breaker 30 will open to interrupt both movement of the conveyor 1 and the rotation of the worm shaft 14. This prevents any false cuts from being made in the belt 1. A rocker 27 ensures that cutting devices 6 always start from exactly the same starting position 25. At the same instant that the magnetic clutch 16 engages, the rocker 27 pivots to the position indicated by broken lines in FIGURE 4 to allow the cutting device 6 to proceed transversely across the belt 1. The left hand end of the rocker 27 (as seen in FIGURE 4) also prevents the next cutting device 6 from proceeding to the starting position 25 until the preceding cutting device 6 is clear of the starting position 25. A further rocker device 27 shown in the upper part of FIGURE 4 also controls return movement of the cutting device 6 from the upper rail 13 onto the left hand rotary disc 24.

As seen in FIGURE 6, the position of the contact 28 can be varied axially along the length of the worm shaft 14 by a shaft 29 provided with a handle. Rotation of the shaft 29 moves the contact 28 axially and thus the width of the strips to be cut from the belt 1 can be varied by varying the axial position of the contact 28.

The way in which the left hand disc 24 rotates and is controlled can be described with reference to FIGURES 4 and 7. Movement of a cutting device 6 onto a rail member 32 of the rotary disc 24 actuates a contact 34. As one cutting device 6 moves onto the rotary disc 24, a further cutting device 6 leaves the rotary disc 24 and actuates a further contact 35. Actuation of both contacts 34 and 35 causes the disc 24 to rotate. It will be appreciated that, since both contacts 34 and 35 must be operated before disc 24 rotates, it is ensured that the previous cutting device 6 has left the disc 24 and a further device 6 has joined the disc 24 before rotation occurs. Actuation of the contact 35 causes compressed fluid to be admitted to a ram 38 (see FIGURE 7) which thus operates a rack 39 connected to the piston thereof. Rack 39 rotates a cog wheel 40 attached to the disc 24 which thus rotates to move the cutting device 6 from the upper rail 13 to the lower rail 13. When the disc 24 has rotated to the correct extent, a ram 42 operates a mechanical stop 41 which engages with a hole in the periphery of disc 24 to lock it in position. The rack 39 is retracted into the ram 38 without reversing the movement of the disc 24 since the cog wheel 40 has a free wheel mounting with the disc 24 such that it rotates the disc 24 in one direction only. Both the rotary discs 24 at each end of the machine are operated in the same way.

With the machine described, web of material 1 can be cut into a plurality of strips 5, the angle α being variable to suit the prevailing conditions. By ensuring that the feed rate of web 1 and transverse speed of devices 6 are constant, parallel strips of accurate size can be cut. The widths of the strips can be controlled by varying the position of contact 28, thus controlling the spacing between consecutive cutting devices 6.

Although the machine described above is particularly suitable for cutting materials for use in the manufacture of motor car tyres, it can, of course, be used for cutting any material in which it is desired to cut parallel strips of the material from a substantially continuous length thereof. Thus the machine could be used for cutting fabrics such, for example, as cord fabric consisting of impregnated or coated textile fibres or metal strands, or aluminium, synthetic resin materials or paper. Instead of using cutting blades or wheels as described, some other form of parting or cutting element could be used, for example, a nibbler or grinding disc. The cutter blades 7 described above instead of having smooth edges can, of course, be provided with serrated edges.

What is claimed is:

1. A machine for cutting an elongate web of material into strips comprising means for continuously moving the web in a first linear direction which is along the length of the web, said means including an endless belt on which the web rides; a plurality of cutting devices; means for continuously and simultaneously moving said cutting devices across the width of the web in a second linear direction which is transverse to said first linear direction to thereby cut the web into a plurality of strips each of which defines an obtuse angle with the length of the web; means for varying the obtuse angle between the cut strips and the length of the web, said means including a common drive for the two moving means and a variable ratio gear arrangement for adjusting the ratio of the speed of movement of said cutting device moving means to the speed of movement of said web moving means; and means for varying the width of said strips, said means including means for adjusting the spacing between said cutting elements.

2. A machine as claimed in claim 1 wherein said cutting device comprises a cutting element mounted on a carriage, the carriage being slidably mounted on a guide rail disposed transversely of said web, and a worm and wheel drive for moving the carriage along said guide rail.

3. A machine as claimed in claim 2 wherein the means for moving said endless web of material includes an endless belt looped over rollers and wherein one of the rollers is driven by a belt drive and said worm is driven by a chain drive from a common source.

4. A machine as claimed in claim 2 wherein a further guide rail is provided for returning the cutting device to the one side of the web at which the cutting is started.

5. A machine as claimed in claim 4 wherein said guide rails are fixed to supporting structure mounted over the web and including transfer devices at the ends of said supporting structure to transfer the cutting device from one guide rail to the other.

6. A machine as claimed in claim 2 wherein said worm wheel is in constant engagement with said worm, and further comprising a clutch for connecting and disconnecting said worm wheel and said carriage.

7. A machine as claimed in claim 6 wherein said clutch is electromagnetic and includes a circuit having a limit switch adjustable axially of the worm to control operation of the cutter and vary the width of strip cut.

8. A machine as claimed in claim 7 wherein there are a plurality of cutting devices, the limit switch controlling the spacing between consecutive cutting devices as they cut said web.

9. A machine as claimed in claim 8 wherein each cutting device is held at the one edge of said web and is released therefrom by a rocker abutment.

10. A machine for cutting an elongate web of material into strips comprising:
  means for continuously moving the web in a first linear direction which is along the length of the web, said moving means including an endless belt on which the belt rides; a cutting element;
  means for continuously and simultaneously moving said cutting element across the width of the web in a second linear direction which is transverse to said first linear direction to cut the web into a plurality of strips each of which defines an obtuse angle with the length of said web, said moving means including supporting structure mounted over said endless belt; first and second parallel guide rails extending across said belt and fixed to said supporting structure; a carriage slidably mounted on said first guide rail for movement therealong, said cutting element being mounted on said carriage for movement therewith, and a worm and wheel drive for moving said carriage along said first guide rail;
  transfer devices at the ends of said supporting structure for transferring said cutting element from one guide rail to the other, each of said transfer devices including a rotatable disc mounted for rotation about an axis parallel with the axes of said guide rails and provided with at least two rail members adapted to form continuations of said guide rails, each of said transfer devices further including means for rotating said discs between said guide rails to transfer said cutting device from an end of one of said rails to the corresponding end of the other rail;
  means for returning said cutting element along said second rail to the side of the web at which cutting is started.

11. A machine as in claim 10 wherein said means for moving said cutting device further includes a worm shaft extending transversely of the web and a wheel drive cooperating with said shaft, said rotatable discs being coaxial with said shaft.

12. A machine as in claim 10 including mechanical stops for locking said discs in predetermined positions.

References Cited by the Examiner

UNITED STATES PATENTS

| | | | |
|---|---|---|---|
| 1,635,531 | 7/1927 | Brundage | 83—353 |
| 1,737,146 | 11/1929 | Castricum | 83—353 |
| 2,670,040 | 2/1954 | Sayles | 83—484 |

ANDREW R. JUHASZ, *Primary Examiner.*